(12) United States Patent
Jo et al.

(10) Patent No.: US 10,826,117 B2
(45) Date of Patent: Nov. 3, 2020

(54) ELECTROLYTIC COPPER FOIL FOR GRAPHENE AND METHOD FOR PRODUCING THE COPPER FOIL

(71) Applicant: ILJIN MATERIALS CO., LTD., Iksan (KR)

(72) Inventors: Tae Jin Jo, Iksan (KR); Sun Hyoung Lee, Iksan (KR); Seul-Ki Park, Iksan (KR); Ki Deok Song, Iksan (KR)

(73) Assignee: ILJIN MATERIALS CO., LTD., Iksan (KR)

( * ) Notice: Subject to any disclaimer, the term of this patent is extended or adjusted under 35 U.S.C. 154(b) by 0 days.

(21) Appl. No.: 16/088,840

(22) PCT Filed: Mar. 21, 2017

(86) PCT No.: PCT/KR2017/003006
§ 371 (c)(1),
(2) Date: Sep. 27, 2018

(87) PCT Pub. No.: WO2017/188600
PCT Pub. Date: Nov. 2, 2017

(65) Prior Publication Data
US 2019/0088992 A1 Mar. 21, 2019

(30) Foreign Application Priority Data

Apr. 28, 2016 (KR) .................. 10-2016-0052526

(51) Int. Cl.
| | |
|---|---|
| *B21C 37/02* | (2006.01) |
| *H01M 10/0562* | (2010.01) |
| *C25D 3/38* | (2006.01) |
| *C01B 32/184* | (2017.01) |
| *C25D 1/04* | (2006.01) |
| *C25D 7/06* | (2006.01) |
| *B82Y 30/00* | (2011.01) |
| *B82Y 40/00* | (2011.01) |

(52) U.S. Cl.
CPC ....... *H01M 10/0562* (2013.01); *C01B 32/184* (2017.08); *C25D 1/04* (2013.01); *C25D 3/38* (2013.01); *C25D 7/0614* (2013.01); *B82Y 30/00* (2013.01); *B82Y 40/00* (2013.01); *Y10T 428/12431* (2015.01)

(58) Field of Classification Search
None
See application file for complete search history.

(56) References Cited

U.S. PATENT DOCUMENTS

| | | | | |
|---|---|---|---|---|
| 5,482,784 A | * | 1/1996 | Ohara | H05K 3/384 205/111 |
| 8,153,273 B2 | * | 4/2012 | Saito | H05K 3/384 428/626 |
| 2015/0030873 A1 | | 1/2015 | Cheng et al. | |

FOREIGN PATENT DOCUMENTS

| | | | |
|---|---|---|---|
| JP | 2013-107036 A | 6/2013 | |
| JP | 2013107036 * | 6/2013 | ............. B01J 23/72 |
| KR | 10-2000-0064294 A | 11/2000 | |
| KR | 10-2007-0117465 A | 12/2007 | |
| KR | PCT/KR2011/002670 A2 | 10/2011 | |
| KR | 10-2014-0043133 A | 4/2014 | |

OTHER PUBLICATIONS

Enhanced Graphene Mechanical Properties through Ultra-Smooth Copper Growth Substrates, Mark Griep, et al., Nano Lett, Just Accepted Manuscript DOI: 10.1021/acs.nanolett.5b04531.
Significant enhancement of the electrical transport properties of graphene films by controlling the surface roughness of Cu foils before and during chemical vapor deposition, Dongmok Lee, et al., Nanoscale, 2014, 6, 12943.

* cited by examiner

*Primary Examiner* — Seth Dumbris
(74) *Attorney, Agent, or Firm* — Patent Office of Dr. Chung Park

(57) ABSTRACT

The present disclosure relates to an electrolytic copper foil for graphene and a method for producing the copper foil. More particularly, the present disclosure relates to an electrolytic copper foil for graphene and a method for producing the copper foil, which may facilitate formation of graphene by blocking surface deformation during the electrolytic copper foil formation. In accordance with the present disclosure, the Rz roughness of the S-face of the electrolytic copper foil after 1 hour treatment at 200° C. in the synthesis of graphene on the electrolytic copper foil is defined based on the Relationship 1 below. This may also minimize the deformation of the surface of the electrolytic copper foil at high temperatures:

0.05≤(*Rz* roughness of *M*-face of electrolytic copper foil/*Rz* roughness of *S*-face after treatment at 200° C. for 1 hour)/thickness of electrolytic copper foil≤0.2.      Relationship 1:

3 Claims, No Drawings

US 10,826,117 B2

ELECTROLYTIC COPPER FOIL FOR GRAPHENE AND METHOD FOR PRODUCING THE COPPER FOIL

BACKGROUND

1. Technical Field

The present disclosure relates to an electrolytic copper foil for graphene and a method for producing the copper foil. More particularly, the present disclosure relates to an electrolytic copper foil for graphene and a method for producing the copper foil, which may facilitate formation of graphene by blocking surface deformation during the electrolytic copper foil formation.

2. Description of Related Art

A graphene is a term made by combining the graphite used as a pencil lead and the suffix "-ene" representing a molecule with carbon double bonds. Graphite has a structure in which carbon layers of hexagonal honeycomb are stacked. The graphene may be considered to be one thinnest layer as removed from the graphite. The graphene, a carbon isotope, is a nanomaterial composed of carbon atoms such as carbon nanotubes and Fullerene. Graphene has a two-dimensional planar shape. The thickness of the graphene is 0.2 nm (1 nm is one-billionth of one meter), which is extremely thin. That is, the thickness of graphene is extremely thin, that is, about two-billionths of one meter. Furthermore, the physical and chemical stability of graphene is high.

Further, graphene has more than 100 times more electricity than copper. Graphene can move electrons more than 100 times faster than monocrystalline silicon, which is mainly used as a semiconductor. The strength of graphene is 200 times stronger than steel. The thermal conductivity of graphene is two times higher than that of diamond with the highest thermal conductivity. Furthermore, the graphene's elasticity is excellent, so that it does not lose its electrical properties even when it is stretched or bent.

Due to these properties, graphene is regarded as a material that goes beyond carbon nanotubes, which are attracted by the next generation of new materials, and is called a dream nanomaterial. Graphene and carbon nanotubes have very similar chemical properties. In those materials, metallic and semiconducting properties may be separated from each other by a post-process. However, because graphene has a more uniform metallicity than carbon nanotubes, the graphene is more likely to be applied industrially. Further, graphene is attracting attention as a future-oriented new material in the electronic information industry, which may allow production of bendable displays, electronic paper, and wearable computers.

In 2004, the Geim and Novoselov teams at the University of Manchester became the first to succeed in separating atomic layers from graphite with Scotch tape. As a result, graphene was invented. They were awarded the 2010 Nobel Prize in Physics. In 2010, roll-to-roll technology, which transfers 30-inch large-area graphene was developed. In 2013, a specific roll-to-roll graphene synthesis technology that goes beyond the idea level has been unveiled. Thereafter, the development of graphene continues to be commercialized.

However, it is important to uniformly realize a single-layer graphene thin film in order to utilize graphene industrially. The number of layers of the graphene sheet as obtained by the method of peeling the graphene using the adhesive tape is not constant. In this case, a large-area graphene sheet is not easily obtained. This method has a problem that it is not suitable for mass production.

Further, in the prior art, there is a problem that multi-layer graphene on the copper foil is distributed in an island shape and grows non-uniformly, and amorphous carbon coexists with graphene/As a result, it is difficult to obtain clean single-layer graphene and, thus, the conductivity is deteriorated.

DISCLOSURE OF INVENTION

Technical Purposes

The present disclosure is to provide an electrolytic copper foil for graphene and a method for producing the copper foil in which a Rz roughness of a S-face of the electrolytic copper foil after 1 hour treatment at 200° C. in the synthesis of graphene on the electrolytic copper foil is based on Relationship 1 below:

$0.05 \leq (Rz$ roughness of $M$-face of electrolytic copper foil/$Rz$ roughness of $S$-face after treatment at 200° C. for 1 hour)/thickness of electrolytic copper foil$\leq 0.2$. Relationship 1:

Further, the present disclosure is to provide an electrolytic copper foil for graphene and a method for producing the copper foil in which a graphene having a resistance value of less than 300 ohm/square after the synthesis of the graphene on the electrolytic copper foil is produced, thereby, facilitate the formation of graphene on the electrolytic copper foil.

Technical Solutions

In one embodiment of the present disclosure, there is provided an electrolytic copper foil for graphene, wherein a Rz roughness of a S-face of the electrolytic copper foil after thermal-treatment is define based on a following Relationship 1:

$0.05 \leq (Rz$ roughness of $M$-face of electrolytic copper foil/$Rz$ roughness of $S$-face after treatment at 200° C. for 1 hour)/thickness of electrolytic copper foil$\leq 0.2$. Relationship 1:

Further, the thermal treatment may be carried out at a temperature of 180 to 220 degrees Celsius for 50 to 80 minutes.

Furthermore, in the Relationship 1, the Rz roughness of the M-face of the electrolytic copper foil may be 0.3 to 3.0 μm.

Moreover, in the Relationship 1, the thickness of the electrolytic copper foil may be 4 to 70 μm.

Furthermore, a resistance of the graphene after synthesis of the graphene on the electrolytic copper foil for the graphene may be 300 Ω/square or smaller.

In another embodiment of the present disclosure, there is provided a method for producing an electrolytic copper foil for graphene, wherein plating of the copper foil is performed in a copper electrolytic solution under a condition that a total organic carbon (TOC) concentration in the copper electrolytic solution is kept at 3 ppm or lower and a chlorine concentration in the copper electrolytic solution is kept at 1 ppm or lower.

Further, when plating the copper foil, a temperature of the electrolytic solution may be 30 to 70 degree C. and a current density is 30 to 150 ASD.

Furthermore, when plating the copper foil, a copper concentration in the electrolytic solution may be 60 to 140 g/L, and a sulfuric acid concentration in the electrolytic solution may be 70 to 200 g/L.

Technical Effects

In accordance with the present disclosure, the Rz roughness of the S-face of the electrolytic copper foil after 1 hour treatment at 200° C. in the synthesis of graphene on the electrolytic copper foil is defined based on the Relationship 1 above. This may also minimize the deformation of the surface of the electrolytic copper foil at high temperatures.

Further, the present disclosure may provide the electrolytic copper foil for graphene and the method for producing the copper foil in which a graphene having a resistance value of less than 300 ohm/square after the synthesis of the graphene on the electrolytic copper foil is produced, thereby, facilitate the formation of graphene on the electrolytic copper foil.

DETAILED DESCRIPTIONS

The details of other embodiments are included in the detailed description and drawings.

The advantages and features of the present disclosure, and how to accomplish them, will become apparent with reference to the embodiments described in detail below with reference to the accompanying drawings. However, the present disclosure is not limited to the embodiments disclosed below but may be implemented in various other forms. In the following description, when a certain portion is connected to another portion, this includes not only the case where they are directly connected but also the case where they are connected via another medium therebetween. Further, parts of the drawing that do not relate to the present disclosure have been omitted to clarify the description of the present disclosure. Like parts are designated with like reference numerals throughout the specification.

Hereinafter, the present disclosure will be described in detail.

The present disclosure relates to an electrolytic copper foil for graphene and a method for producing the copper foil. More particularly, the present disclosure relates to an electrolytic copper foil for graphene and a method for producing the copper foil, which may facilitate formation of graphene by blocking surface deformation during the electrolytic copper foil formation.

One embodiment provides an electrolytic copper foil for graphene in which a Rz roughness of a S-face of the electrolytic copper foil after 1 hour treatment at 200° C. in the synthesis of graphene on the electrolytic copper foil is based on Relationship 1 below:

0.05≤(Rz roughness of M-face of electrolytic copper foil/Rz roughness of S-face after treatment at 200° C. for 1 hour)/thickness of electrolytic copper foil≤0.2.   Relationship 1:

In the Relationship 1, the Rz roughness of the M-face of the electrolytic copper foil may be 0.3 to 3.0 μm. When in the Relationship 1, the Rz roughness of the M-face of the electrolytic copper foil is smaller than 0.3 μm, the surface roughness is too low, so that irregularities are not formed well on the surface of the copper foil. As a result, the adhesion of the electrolytic copper foil decreases, which is undesirable. To the contrary, when in the Relationship 1, the Rz roughness of the M-face of the electrolytic copper foil is larger than 3.0 μm, the physical adsorption rapidly occurs at the portion where the surface roughness of the electrolytic copper foil is large or at the portion where the scratch is present. This inhibits the uniform catalytic reaction, which may result in uneven and excessive formation of multi-layer graphene. Further, when a protective film resin is applied in the process after the graphene synthesis, the resin is applied in a non-uniform thickness, and residual portions occur after removal of the protective film resin. Thereby, there may arise a problem of lowering the transmittance and conductivity. Accordingly, in accordance with the present disclosure, in the Relationship 1, the Rz roughness of the M-face of the electrolytic copper foil may be 0.3 to 3.0 μm.

Further, in the Relationship 1, the thickness of the electrolytic copper foil may be 4 to 70 μm. When in the Relationship 1, the thickness of the electrolytic copper foil is smaller 4 μm, the electrolytic copper foil tends to be broken and, thus, the handling property in the subsequent process is lowered, which is undesirable. Further, when the thickness of the electrolytic copper foil exceeds 70 μm, the removal via the etching may be poor when the copper foil is removed by the etching after the graphene is synthesized on the electrolytic copper foil.

Further, a resistance of the graphene after synthesis of the graphene on the electrolytic copper foil for the graphene may be 300 Ω/square or smaller. Otherwise, when the resistance of the graphene after synthesis of the graphene on the electrolytic copper foil for the graphene exceeds 300 Ω/square, there is a problem that graphene is not properly synthesized on the electrolytic copper foil.

Further, in a method for producing an electrolytic copper foil for graphene in one embodiment of the present disclosure, plating of the copper foil may be performed in a copper electrolytic solution under a condition that a total organic carbon (TOC) concentration in the copper electrolytic solution is kept at 3 ppm or lower and a chlorine concentration in the copper electrolytic solution is kept at 1 ppm or lower. In the present specification, the TOC stands for Total Organic Carbon. This is the term of the amount of carbon in the organic contents contained in the liquid. When the TOC concentration is higher than 3 ppm, there is a lot of impurities in the copper foil, which greatly affects recrystallization. Thus, it is preferable that the TOC value in the plating bath for the electrolytic copper foil has a value of 3 ppm or smaller.

Further, when plating the copper foil, a temperature of the electrolytic solution may be 30 to 70 degree C. and a current density is 30 to 150 ASD. When plating the copper foil, a copper concentration in the electrolytic solution may be 60 to 140 g/L, and a sulfuric acid concentration in the electrolytic solution may be 70 to 200 g/L.

The following is a detailed description of an example of the present disclosure.

(Experiment Example 1) Resistance Test after Graphene Synthesis According to Surface Roughness of Electrolytic Copper Foil for Graphene According to the Present Disclosure In Experiment example 1 of the present disclosure, the resistance after synthesis of graphene on the electrolytic copper foil is tested. In this example, a surface roughness of the electrolytic copper foil for graphene according to one embodiment of the present disclosure may be defined based on the following Relationship 1. Table 1 below is a table measuring the resistance after synthesis of graphene on the electrolytic copper foil when the TOC concentration is defined in Table 1 and a roughness ratio is defined in the Relationship 1:

0.05≤(Rz roughness of M-face of electrolytic copper
foil/Rz roughness of S-face after treatment at
200° C. for 1 hour)/thickness of electrolytic
copper foil≤0.2.                                                    Relationship 1:

In the present examples 1 to 8 in the following table 1, the TOC concentration in the electrolytic solution should be 3 ppm or lower. A ratio between the thickness of the copper foil, the M-face roughness at room temperature treatment, and the roughness of the S-face after treatment at 200 DEG C. for 1 hour satisfies 0.05 or larger and 0.2 or smaller, which is the range value of the Relationship 1 above. In this condition, the resistance value after the graphene synthesis was measured. Further, in the comparative example 1 to the comparative example 5 in table 1 below, the TOC concentration in the electrolytic solution was set to exceed 3 ppm. A ratio between the thickness of the copper foil, the M-face roughness at room temperature treatment, and the roughness of the S-face after treatment at 200 DEG C. for 1 hour does not satisfy 0.05 or larger and 0.2 or smaller, which is the range value of the Relationship 1 above. In this condition, the resistance value after the graphene synthesis was measured.

As shown in the following table 1, in the present example 1 of the present disclosure, TOC concentration is 1 ppm. The ratio between the thickness of the copper foil, the M-face roughness at room temperature treatment, and the roughness of the S-face after treatment at 200 DEG C. for 1 hour is 0.11, which is in the range value of the Relationship 1 above. In this case, the resistance value after graphene synthesis was 180 Ω/square. Further, in the present example 4 and the present example, the TOC concentrations are 0.9 ppm and 2 ppm respectively. The ratios between the thickness of the copper foil, the M-face roughness at room temperature treatment, and the roughness of the S-face after treatment at 200 DEG C. for 1 hour are 0.11 and 0.12 respectively, which are in the range value of the Relationship 1 above. In this case, the resistance values after graphene synthesis were 230 and 280 Ω/square respectively, which are both smaller than 300 Ω/square.

On the other hand, as shown in the following table 1, in the comparative example 1 of the present disclosure, TOC concentration is 100 ppm. The ratio between the thickness of the copper foil, the M-face roughness at room temperature treatment, and the roughness of the S-face after treatment at 200 DEG C. for 1 hour is 0.02, which is out of the range value of the Relationship 1 above. In this case, the resistance value after graphene synthesis was 400 Ω/square. Further, in the comparative example 3, TOC concentration is 80 ppm. The ratio between the thickness of the copper foil, the M-face roughness at room temperature treatment, and the roughness of the S-face after treatment at 200 DEG C. for 1 hour is 0.23, which is out of the range value of the Relationship 1 above. In this case, the graphene synthesis did not occur properly. In the case of the comparative example 1 and the comparative example 3, the TOC concentration exceeds 3 ppm. Thereby, a lot of impurities exist in the copper foil. This has a great effect on recrystallization and so on such that the surface roughness of the electrolytic copper foil is negatively affected. As a result, the graphene synthesis is not properly performed.

Therefore, it is preferable that when producing the electrolytic copper foil for graphene, the concentration of TOC in the electrolytic solution is kept below 3 ppm inclusive, and, the electrolytic copper foil for graphene according to the present disclosure has the ratio range as defined in Relationship 1 above

TABLE 1

| Examples | Thickness (μm) | TOC concentration (ppm) | N-face roughness at room temperature treatment | Roughness of S-face after treatment at 200 DEG C for 1 hour | (Rz roughnesss of M-face/Rz roughness of S-face after treatment at 200° C. for 1 hour)/ thickness (drum face: S face, opposite face therato; N face) | Resistance value after graphene synthesis |
| --- | --- | --- | --- | --- | --- | --- |
| Present example 1 | 35 | 1 | 4.83 | 1.2 | 0.11 | 180 |
| Present example 2 | 35 | 2 | 4.78 | 1.3 | 0.10 | 200 |
| Present example 3 | 4 | 1 | 1.32 | 1.2 | 0.18 | 250 |
| Present example 4 | 12 | 0.9 | 1.76 | 1.3 | 0.11 | 230 |
| Present example 5 | 18 | 0.8 | 1.93 | 1.4 | 0.07 | 200 |
| Present example 6 | 70 | 3 | 7.5 | 1.4 | 0.15 | 150 |
| Present example 7 | 10 | 2 | 1.61 | 1.3 | 0.12 | 280 |
| Present example 8 | 10 | 1 | 1.65 | 1.2 | 0.14 | 290 |
| Comparative example 1 | 35 | 100 | 1.44 | 1.7 | 0.02 | 400 |
| Comparative example 2 | 18 | 200 | 5.10 | 1.3 | 0.22 | No synthesis |
| Comparative example 3 | 12 | 80 | 3.53 | 1.3 | 0.23 | No synthesis |
| Comparative example 4 | 12 | 300 | 3.43 | 1.3 | 0.22 | 500 |
| Comparative example 5 | 10 | 1000 | 3.20 | 1.3 | 0.27 | No synthesis |

Those of ordinary skill in the art to which the present disclosure belongs may understand that the present disclosure may be embodied in other specific forms without departing from the spirit or essential characteristics thereof. It is therefore to be understood that the above-described embodiments are illustrative in all aspects and not restrictive. The scope of the present disclosure is defined by the claims set forth below rather than by the above detailed description. All changes or modifications that come within the meaning and range of the claims and the equivalents thereof are to be construed as being included within the scope of the present disclosure.

What is claimed is:

1. An electrolytic copper foil for synthesis of a single-layer graphene thin film, wherein a Rz roughness of an S-face of the electrolytic copper foil after thermal-treatment is define based on a following Relationship 1:

$$0.05 \leq (Rz \text{ roughness of an } M\text{-face of the electrolytic copper foil}/Rz \text{ roughness of the } S\text{-face after the thermal-treatment})/\text{thickness of the electrolytic copper foil} \leq 0.2, \quad \text{Relationship 1:}$$

wherein the thermal treatment is carried out at a temperature of 180 to 220 degrees Celsius for 50 to 80 minutes, wherein a resistance of the single-layer graphene thin film that is synthesized on the electrolytic copper foil is 300 Ω/square or smaller; and wherein the Rz roughness of the S-face of the electrolytic copper foil is 1.2-1.4 μm after a thermal-treatment performed at 200° C. for 1 hour in a synthesis of graphene on the electrolytic copper foil.

2. The electrolytic copper foil of claim 1, wherein in the Relationship 1, the Rz roughness of the M-face of the electrolytic copper foil is 0.3 to 3.0 μm.

3. The electrolytic copper foil of claim 1, wherein in the Relationship 1, the thickness of the electrolytic copper foil is 4 to 70 μm.

* * * * *